United States Patent
Hardgrove et al.

(10) Patent No.: US 6,436,329 B1
(45) Date of Patent: Aug. 20, 2002

(54) METHOD OF MAKING FUSED FILM PLASTIC PARTS AND PARTS MADE BY SUCH METHODS

(75) Inventors: William H. Hardgrove, Englewood; Hiroaki Yamamoto, Brookville; Michael A. Swartz, Brookville; Andrew G. Yorde, Brookville, all of OH (US)

(73) Assignee: Green Tokai Co., Ltd., Brookville, OH (US)

( * ) Notice: Subject to any disclaimer, the term of this patent is extended or adjusted under 35 U.S.C. 154(b) by 0 days.

(21) Appl. No.: 09/253,667

(22) Filed: Feb. 19, 1999

(51) Int. Cl.$^7$ .............................................. B29C 45/14
(52) U.S. Cl. .................. 264/266; 264/267; 264/275; 425/127; 425/129.1
(58) Field of Search ................ 264/266, 267, 264/275; 425/127, 129.1

(56) References Cited

U.S. PATENT DOCUMENTS

| | | | |
|---|---|---|---|
| 3,122,598 A | 2/1964 | Berger | 264/247 |
| 3,154,617 A | 10/1964 | Schenk et al. | 264/266 |
| 4,060,577 A | 11/1977 | Collins | 264/45.4 |
| 4,230,659 A | 10/1980 | Sutch | 264/266 |
| 4,293,520 A | 10/1981 | Akutsu | 264/513 |
| 4,401,232 A | 8/1983 | Constable et al. | 220/450 |
| 4,414,731 A | 11/1983 | Riemer | 29/453 |
| 4,416,843 A | 11/1983 | Helms | 264/152 |
| 4,722,818 A | 2/1988 | Zoller | 264/171 |
| 4,734,147 A | 3/1988 | Moore | 156/212 |
| 4,797,244 A | 1/1989 | Sauer | 264/266 |
| 5,023,033 A | 6/1991 | Cakmakci | 264/161 |
| 5,098,633 A | 3/1992 | Hausler | 264/511 |
| 5,108,681 A | 4/1992 | Cakmakci | 264/151 |
| 5,162,124 A | 11/1992 | Hausler et al. | 425/384 |
| 5,193,711 A | 3/1993 | Hirata et al. | 220/453 |
| 5,194,194 A | 3/1993 | Kato et al. | 264/37 |
| 5,227,108 A | 7/1993 | Reid, Jr. et al. | 264/148 |
| 5,336,460 A | 8/1994 | Hettinga | 264/251 |
| 5,368,798 A | 11/1994 | Mizukoshi et al. | 264/154 |
| 5,401,457 A | 3/1995 | Valyi | 264/511 |
| 5,456,957 A | 10/1995 | Jackson et al. | 428/31 |
| 5,571,581 A | 11/1996 | Koizumi et al. | 428/31 |
| 5,599,608 A | 2/1997 | Yamamoto et al. | 428/192 |
| 5,746,962 A | 5/1998 | Yamamoto | 264/266 |
| 5,783,287 A | 7/1998 | Yamamoto et al. | 428/192 |
| 6,168,742 B1 * | 1/2001 | Yamamoto | 264/266 |

FOREIGN PATENT DOCUMENTS

WO            99/56989    * 11/1999

* cited by examiner

Primary Examiner—Jan H. Silbaugh
Assistant Examiner—Edmund H. Lee
(74) Attorney, Agent, or Firm—Biebel & French

(57) ABSTRACT

Methods for making fused film-plastic parts and parts made thereby are disclosed. The paint film covered parts include a show surface section with a paint film laminate overlying the plastic substrate of this section of the part to provide the desired aesthetic appeal. An attachment flange section of the part is provided and is usually hidden from sight when the part is assembled to the auto or truck body structure. The flange serves as a location at which clamps, bolts, rivets or the like can support or attach to the auto to truck structure. A raised portion, such as a boss section, is provided intermediate the show surface section and the attachment flange. This boss is adapted for contiguous or closed spaced positioning adjacent the auto or truck structural part. The boss is completely covered by the paint film with the paint film terminating along the attachment flange.

5 Claims, 5 Drawing Sheets

METHOD OF MAKING FUSED FILM PLASTIC PARTS AND PARTS MADE BY SUCH METHODS

BACKGROUND OF THE INVENTION

1. Field of the Invention

The present invention pertains to improved methods of insert molding a plastic film or the like over a plastic substrate and to fused film-plastic parts made thereby.

2. Description of the Prior Art

A variety of injection molded parts are made and used for automobile body and trim parts. For example, bumpers, body panels, doors, filler panels, wheel covers, dashboards, arm rests and other parts have been made via injection molding techniques. Additionally, with regard to automobile exteriors, body side moldings, belt line moldings, roof moldings and window moldings are made via injection molding of PVC or other thermoplastic materials.

In order to provide a painted surface for these parts, film lamination techniques have been successfully employed. In accordance with these processes, a paint film laminate is insert molded with the desired thermoplastic to fuse the film over the injection molded part. The resulting injection molded part is ready for assembly without subsequent painting.

The paint film laminate used in these insert molding techniques may comprise a backing sheet to which paint layers are adhered. Typically, the backing sheet comprises an extruded thermoplastic sheet.

In such paint film laminates, a paint film, comprising a cast dried continuous paint coating, is provided over the backing sheet. The paint film may consist of a monocoat, a clear coat over a base coat or a clear coat and a base coat with interposed print or design. The paint film, including base coat, clear coat and print or design, if desired, may range from about 0.5–4 mil. in thickness.

The laminated paint films are available, for example, from Avery Dennison, Automotive Division, or Rexham Decorative Products, Charlotte, N.C. The films are typically provided in a roll, unwound, shaped and trimmed to a proper "preform" size and shape, ready for insertion into an injection mold.

The preform is usually placed along the cavity side of the injection mold with the painted side thereof facing the mold cavity surface. In some instances, the preform may be placed along the core side of the mold. The mold is then clamped and the desired molten resin is injected into the mold cavity. Heat and pressure conditions in the mold partially melt the backing sheet and a melt bonding or fusion of the injected resin and film occur. Injection molds used for these processes are rear or edge gated so that the molten resin is directed along the backside of the film.

Techniques for preforming paint film laminates and insert molding film-plastic parts are disclosed in U.S. Pat. Nos. 5,559,608; 5,746,962; 5,759,477; and 5,783,287. The disclosures of these patents are incorporated herein by reference.

In many cases, it is desired to provide a paint file covered auto or truck part, such as a chin-molding or rocker panel that is adapted for mounting under or over an associated auto or truck body structural part such as a bumper or the like. In many of these structural combinations, a raised portion or boss of the paint film covered auto or truck part is provided in contiguous or closely spaced relation with the associated auto structural part. Due to the close spacing of the boss to the adjacent auto or truck part, the edge of the paint film laminate, overlying this boss region, may separate from the underlying plastic substrate, leading to an unsightly appearance.

Accordingly, there is a need for a method of providing such paint film covered part that will minimize chances of separation of the paint film from its underlying plastic substrate, especially in those regions of the part that are adapted for contiguous or closely spaced position adjacent a mating auto or truck structural or decorative part.

SUMMARY OF THE INVENTION

These needs and others are addressed by the instant methods and fused film-plastic parts made thereby. More specifically, parts formed by the present method include show sections which are designed to be visible when the parts are installed on finished assemblies such as automobiles or trucks.

The parts include a show surface section with the paint film laminate overlying the plastic substrate at this section of the part to provide the desired aesthetic appeal. An attachment flange section of the part is provided and is usually hidden from sight when the part is assembled to its associated auto or truck structural or decorative part. This flange serves as a mounting location where clamps, bolts, rivets, or other fastening devices can securely attach the paint film covered part to the auto or truck structure.

A raised portion, such as a boss section, is provided intermediate the show surface and attachment flange. This boss is adapted for contiguous or closely spaced positioning adjacent the auto or truck body or structural part. The boss is completely covered by the paint film with the paint film terminating along the attachment flange.

In accordance with the instant methods, the paint film covered part is generally molded in accordance with conventional co-molding injection techniques wherein molten plastic is injected into the die cavity, usually alongside the rear side of the paint film laminate, forcing the laminate to conform to the desired surface configuration of the molding cavity. In accordance with the invention, a specially configured die cavity combined with a novel positioning of the pain film therein, upon molding, results in the aforementioned paint film covered plastic part.

The invention will be further described in conjunction with the following detailed description and appended drawings.

In the drawings:

DETAILED DESCRIPTION OF THE PREFERRED EMBODIMENT

Figure 1:
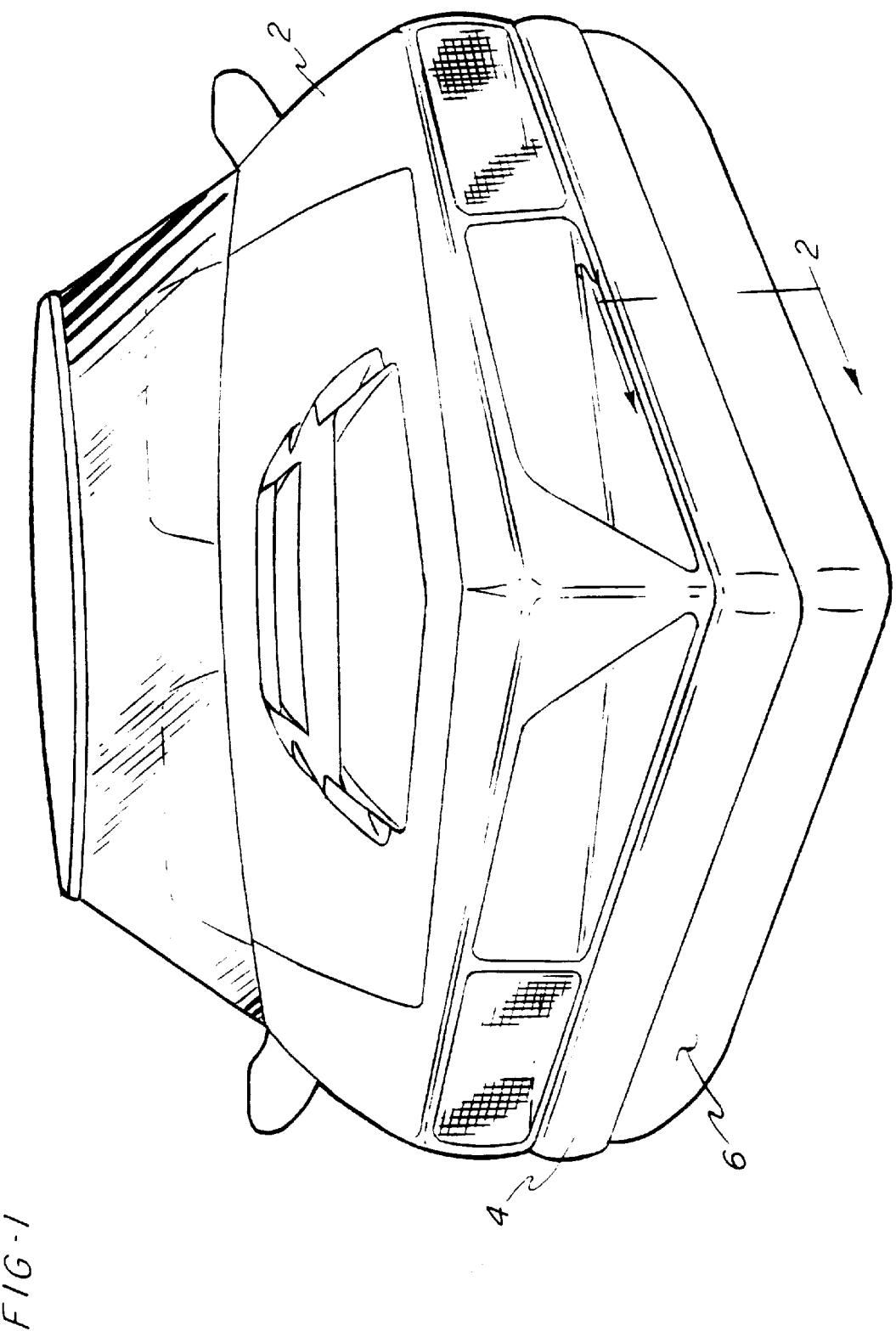
FIG. 1 is a front end view of an automobile including a chin-molding, a paint film covered part made in accordance with the invention.

Turning now to FIG. 1, there is shown an automobile 2 with front end bumper 4 mounted thereon. Immediately below the bumper and in contiguous relation thereto is a chin-molding member 6 made in accordance with the invention.

The chin-molding member is a plastic member comprising a plastic substrate and overlying paint film laminate. With regard to FIG. 2, the chin-molding 6 is shown in its position under the front end bumper 4. The chin-molding, as shown is contiguous to the front end bumper, but, it will be appreciated, that structural variations can be made such as a close spacing of the chin-molding member to the front end bumper.

The chin-molding 6 comprises plastic material 9 and overlying paint film 8. The chin-molding is composed a show surface 10 a boss section 12 and an attachment flange 14. The show surface 10 is covered with paint film 8 to provide the desired aesthetic impression to the viewer. The boss 12 comprises a raised portion of the chin-molding which is received in a corresponding recess 16 formed in the bumper. The attachment flange 14 is adapted for direct attachment to attachment flange 18 of the bumper through conventional means such as clips, rivets, bolts or the like (not shown). In many of the prior art structural combinations, the end of the paint film 8 is positioned along the boss section. This, as mentioned previously, can cause peeling or flaying of the paint film edge providing an unsightly appearance to the overall structure.

Figure 3:
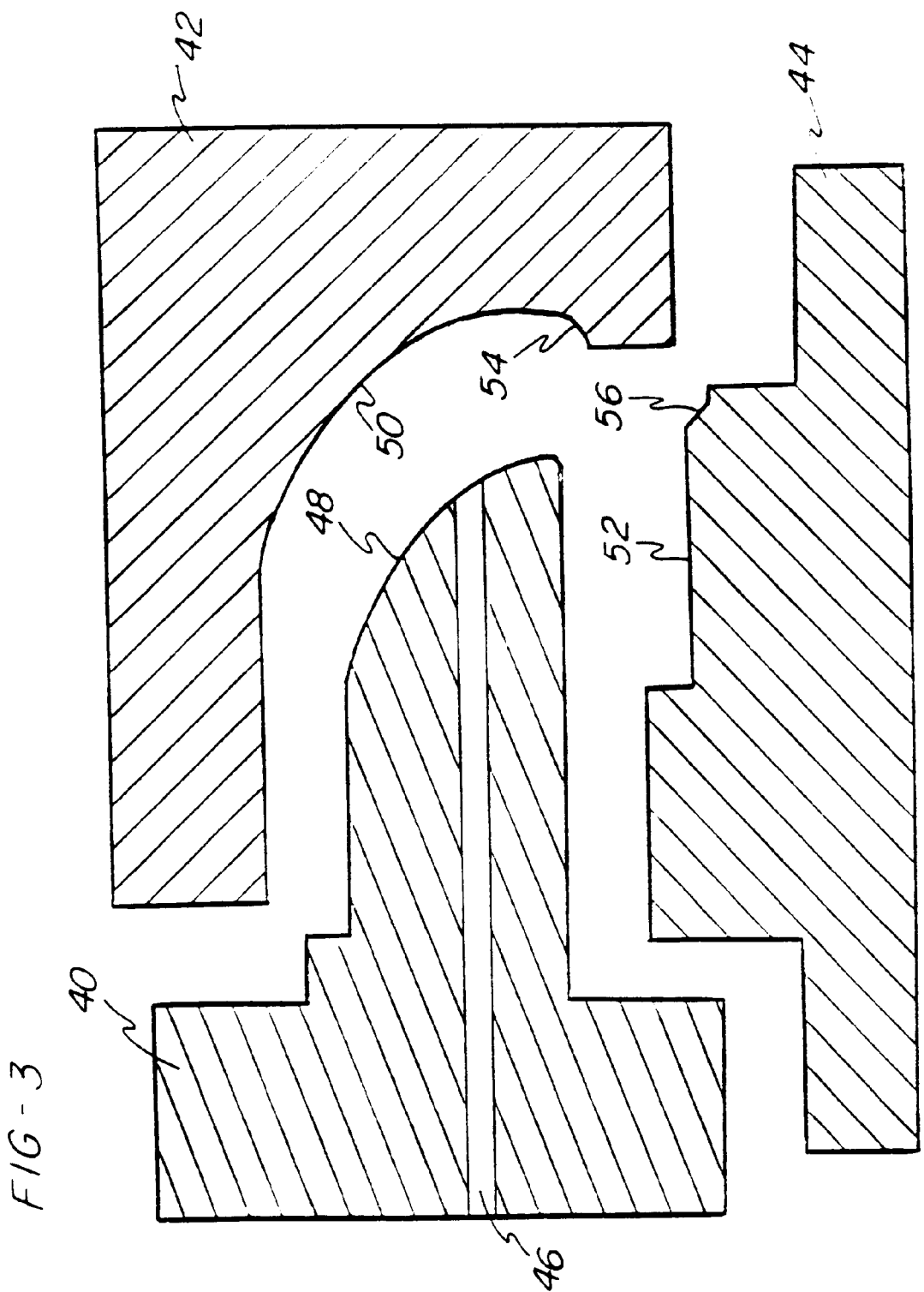
FIG. 3 is a schematic, sectional view of a molding apparatus used in accordance with the invention to make the chin-molding part shown in FIG. 1.

Turning now to FIG. 3, there is shown a molding apparatus adapted to form from convention co-molding injection molding techniques, the chin-molding 6 as shown in FIG. 1. The molding members comprise a male molding member 40, a female molding member 42 and a stationary molding member 44. The view shown in FIG. 3 is somewhat exploded so as to better show the surface configuration and overall relationship between the three molding members. The male molding member 40 is adapted for reciprocation along a horizontal axis as shown in the figure with the female molding member 42 also shown adapted for reciprocal movement along the horizontal axis.

A sprue 46 is provided in the male molding member so that molten plastic may be injected into the cavity filmed between the mold members. A convex cavity surface 48 is provided along the male member and this cooperates with the concave cavity surface 50 of the female mold member and the concave cavity surface 52 of the stationary member to provide a mold cavity in which the chin-molding will be co-molded. A concave curved surface 54 of the female member cooperates with the concave, curved surface 56 of the stationary member to, in combination, form a boss portion of the mold cavity, which, after molding, will result in or correspond to the boss 12 of the molded, finished part shown in FIG. 2 of the drawings.

Figure 4:
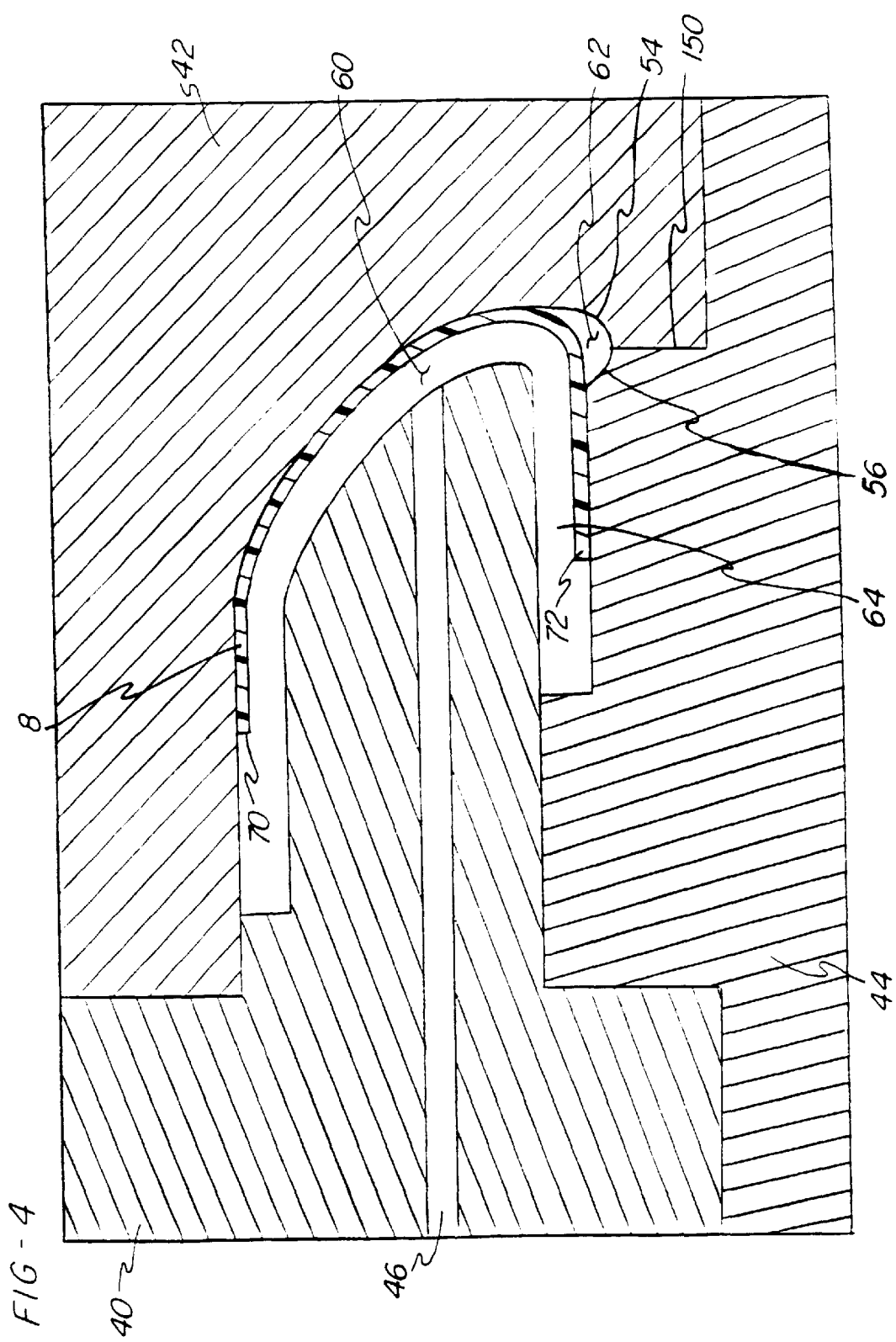
FIG. 4 is a schematic sectional view of the molding apparatus shown in FIG. 3, with the paint film positioned therein in accordance with the instant methods.

Turning now to FIG. 4, the members 40, 42, and 44 together define a show surface cavity 60, a boss cavity 62 and an attachment flange cavity 64. The boss cavity 62 is formed by the cooperation of surface members 54, 56 formed respectively in the female and stationary mold members (see FIG. 3). Paint film 8 is positioned in the mold cavity with a first end 70 of the paint film positioned in the show face cavity 60 and with the opposite end 72 of the paint film extending through the boss cavity 62 and terminating in the attachment flange cavity 64. The end 72 also extends past the part line 150 formed between the female and stationary mold members to thereby minimize pinching of the film that may otherwise occur if the edge 72 were disposed at or proximate the part line.

Figure 2:
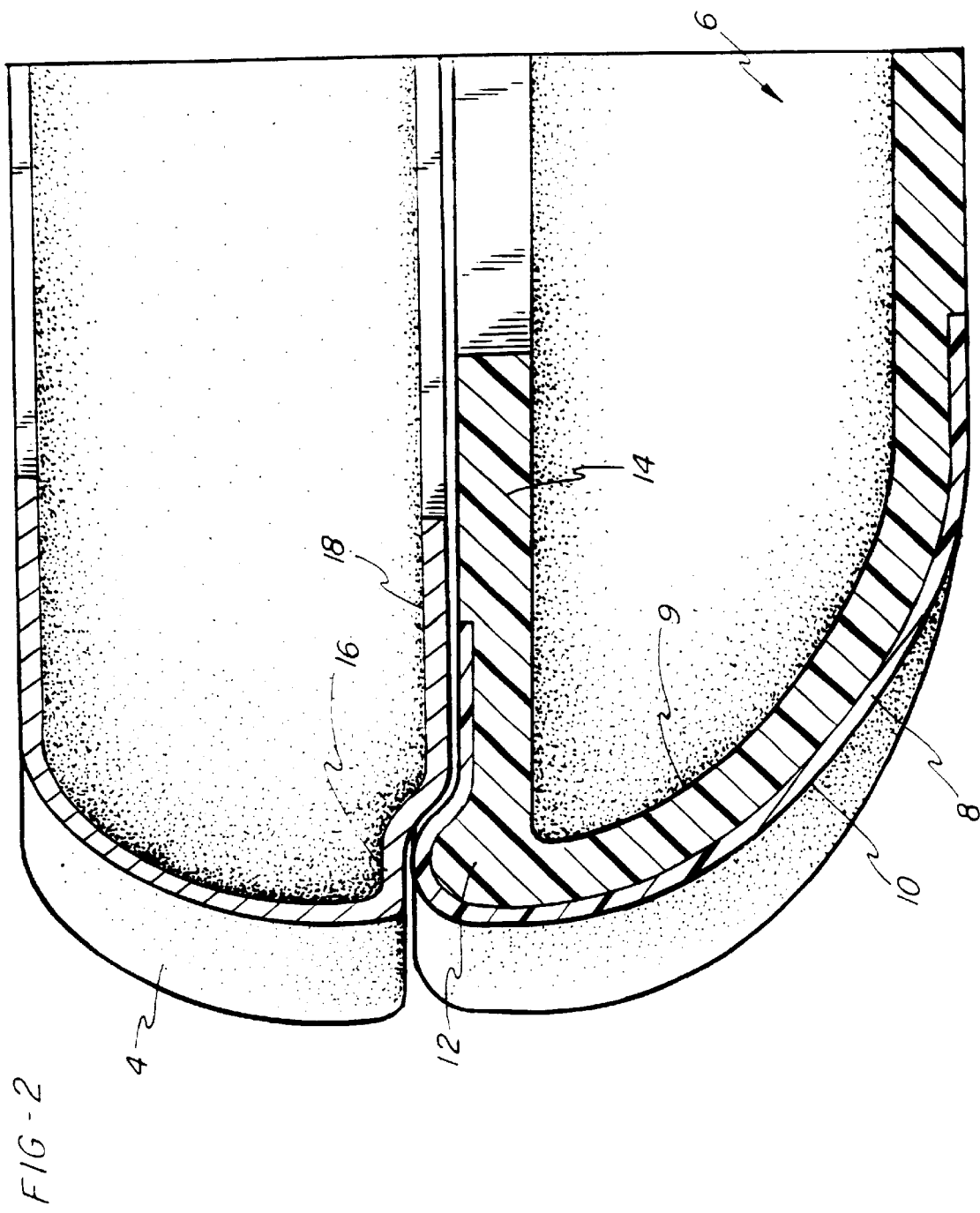
FIG. 2 is a cross-sectional view taken along the plane represented by the lines and arrows 2—2 of FIG. 1.
Figure 5:
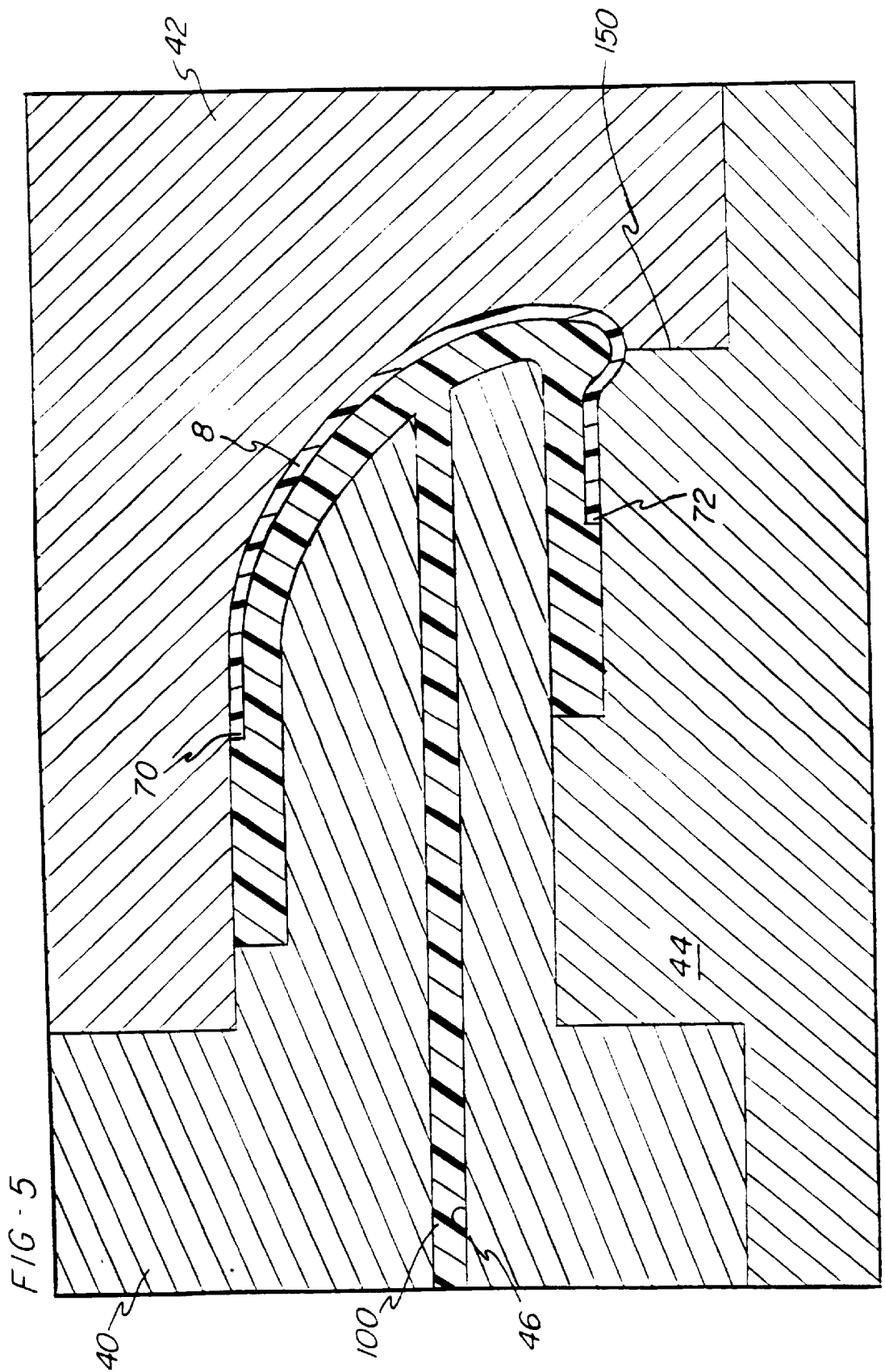
FIG. 5 is a schematic sectional view of the molding apparatus shown in FIG. 4 after injection of the molten plastic material therein to form the part shown in FIG. 1.

FIG. 5 depicts injection of plastic material 100 into the mold cavity. The plastic, when injected, will impinge upon the rear side of the film and force the film to conform to the shape of the cavity surfaces. As shown, the plastic material extends through the show face cavity, boss cavity and attachment flange cavity. The paint film, by reason of co-molding process, thereby covers at least a portion of the plastic along the show face cavity and all of the plastic in the boss cavity. The film extends along at least a portion of the flange cavity 64. In accordance with the process then, the chin-molding such as that shown in FIGS. 1 and 2 is provided wherein the paint film extends completely around the boss section of the chin-molding and terminates in the attachment flange portion. This attachment flange portion of the chin-molding is usually hidden from the viewers eye as depicted in FIG. 2 of the drawings. As can be seen in FIG. 2, it completely covers the boss and terminates in the attachment flange portion of the chin-molding, so as to minimize the chance that the edge will become flayed or the paint film separated from the underlying plastic substrate during assembly or afterward.

In an especially preferred embodiment, it can be seen that the attachment flange (for example in FIG. 4) is formed at an angle that is re-entrant relative to the vertically shown extremity of the boss cavity portion as located at the surfaces 54,56.

Having described the invention in detail and by reference to the preferred embodiments thereof, it is apparent that modifications and variations are possible without departing from the scope of the invention as defined in the appended claims.

In the claims:

1. In a method of making a film covered plastic part of the type for snug positioning against an auto or truck body structure, wherein said film covered part has a show side portion covered by said film, an attachment flange for connection of said part to said auto or truck body structure, and a boss section connecting said show side portion to said attachment flange, the improvement comprising:

(a) providing a die assembly defining a die cavity for molding said film covered plastic part, said die cavity including a show face cavity, an attachment flange cavity, and a boss cavity connecting said show face cavity and said attachment flange cavity;

(b) placing said film in said die cavity, said film having a first end positioned in said show face cavity and an opposite end extending through said boss cavity and terminating in said attacment flange cavity; and (c) injecting molten plastic into said die cavity and along said show face cavity, boss cavity, and said attachment flange cavity, whereby said film is superposed over said molten plastic so that said first end of said film covers at least a portion of said plastic disposed in said show face cavity, and said opposite end of said film covers all of said plastic in said boss cavity and at least a portion of said plastic in said attachment flange cavity to form said film covered plastic part.

2. Method as recited in claim 1 wherein said attachment flange cavity is formed at a re-entrant angle relative to said boss cavity.

3. Method as recited in claim 1 wherein said film is a paint film laminate.

4. Method as recited in claim 1 wherein said die assembly comprises a three piece die assembly defining said die cavity and wherein said show face cavity, said attachment flange cavity and said boss cavity are formed between interfacial surfaces of said three piece die assembly.

5. Method as recited in claim 4 wherein said three piece die assembly comprises a female, male, and stationary mold member, said stationary molding member comprising a concave curve surface and said female molding member comprising a concave curve surface, and wherein said boss cavity comprises a portion of said concave curve surface of said stationary molding member and a portion of said concave curve surface of said female molding member, said stationary molding member and said female molding member further defining a part line which separates said stationary molding member from said female molding member proximate said boss cavity.

* * * * *